United States Patent
Nishio et al.

(10) Patent No.: US 11,059,391 B2
(45) Date of Patent: Jul. 13, 2021

(54) VEHICLE SEAT SLIDE DEVICE

(71) Applicant: SHIROKI CORPORATION, Fujisawa (JP)

(72) Inventors: Takuya Nishio, Fujisawa (JP); Takanori Sato, Kasugai (JP); Koji Kumagai, Toyokawa (JP)

(73) Assignee: SHIROKI CORPORATION, Fujisawa (JP)

(*) Notice: Subject to any disclaimer, the term of this patent is extended or adjusted under 35 U.S.C. 154(b) by 25 days.

(21) Appl. No.: 16/550,542

(22) Filed: Aug. 26, 2019

(65) Prior Publication Data
US 2020/0070688 A1 Mar. 5, 2020

(30) Foreign Application Priority Data

Aug. 28, 2018 (JP) .............................. JP2018-159081

(51) Int. Cl.
*B60N 2/08* (2006.01)
*B60N 2/07* (2006.01)

(52) U.S. Cl.
CPC ......... *B60N 2/0881* (2013.01); *B60N 2/0705* (2013.01); *B60N 2/0818* (2013.01); *B60N 2/0875* (2013.01)

(58) Field of Classification Search
CPC .... B60N 2/085; B60N 2/0881; B60N 2/0818; B60N 2/0837; B60N 2/0875; B60N 2/0705; B60N 2/0868; B60N 2/0812; B60N 2002/126
See application file for complete search history.

(56) References Cited

U.S. PATENT DOCUMENTS

| 6,631,952 B1 * | 10/2003 | Liebetrau | B60N 2/0806 297/341 |
| 7,926,875 B2 * | 4/2011 | Schmale | B60N 2/123 297/344.11 |
| 10,640,015 B2 * | 5/2020 | Taniguchi | B60N 2/0705 |
| 2003/0080598 A1 * | 5/2003 | Becker | B60N 2/0705 297/341 |

(Continued)

FOREIGN PATENT DOCUMENTS

| FR | 2882537 A1 * | 9/2006 | ........... B60N 2/0818 |
| FR | 2902712 A1 * | 12/2007 | ........... B60N 2/0818 |
| JP | 2018052207 A | 4/2018 | |

*Primary Examiner* — Eret C McNichols
(74) *Attorney, Agent, or Firm* — Buchanan Ingersoll & Rooney PC

(57) ABSTRACT

A vehicle seat slide device includes an upper rail, a lower rail, a lock mechanism, and a lock release mechanism. The lock mechanism restricts relative movement of the upper rail. The upper rail includes two side walls and an upper wall. The lock release mechanism includes a lever member, a push portion, and a spring member. The push portion pushes an unlock element of the lock mechanism and performs an unlocking action with the lock mechanism when the lever member is pivoted based on an operation force. The spring member applies an urging force to the lever member in a direction opposite to the direction in which the lever member is pivoted. The spring member includes an engagement end, which engages the lever member, and a spring body. At least the spring body is arranged in an inner space of the upper rail defined below the upper wall.

10 Claims, 9 Drawing Sheets

(56) References Cited

U.S. PATENT DOCUMENTS

| | | | | |
|---|---|---|---|---|
| 2003/0122412 A1* | 7/2003 | Niimi | ................ | B60N 2/12 |
| | | | | 297/341 |
| 2009/0058169 A1* | 3/2009 | Soga | ................ | B60N 2/0875 |
| | | | | 297/463.1 |
| 2011/0012004 A1* | 1/2011 | Wieclawski | ........... | B60N 2/085 |
| | | | | 248/429 |
| 2012/0019037 A1* | 1/2012 | Rohnert | ............... | B60N 2/0831 |
| | | | | 297/378.1 |
| 2014/0239141 A1* | 8/2014 | Yamada | ................ | B60N 2/085 |
| | | | | 248/430 |
| 2014/0239690 A1* | 8/2014 | Yamada | ................ | B60N 2/123 |
| | | | | 297/344.1 |
| 2014/0353454 A1* | 12/2014 | Yamada | ............... | B60N 2/0818 |
| | | | | 248/430 |
| 2015/0034791 A1* | 2/2015 | Yamada | ............... | B60N 2/0843 |
| | | | | 248/429 |
| 2015/0321583 A1* | 11/2015 | Sasaki | ................ | B60N 2/0727 |
| | | | | 297/341 |
| 2016/0090011 A1* | 3/2016 | Stutika | ................ | B60N 2/0881 |
| | | | | 248/429 |
| 2017/0136920 A1* | 5/2017 | Ioppolo | ................... | B60N 2/20 |
| 2018/0257514 A1* | 9/2018 | Taniguchi | .............. | B60N 2/085 |
| 2019/0070981 A1* | 3/2019 | Jakubowicz | ........... | B60N 2/929 |
| 2019/0126785 A1* | 5/2019 | Sasaki | ................ | B60N 2/0705 |
| 2020/0231069 A1* | 7/2020 | Seto | ...................... | B60N 2/085 |
| 2020/0276919 A1* | 9/2020 | Kumagai | ............. | B60N 2/0881 |
| 2020/0406786 A1* | 12/2020 | Nishio | ................ | B60N 2/0818 |

* cited by examiner

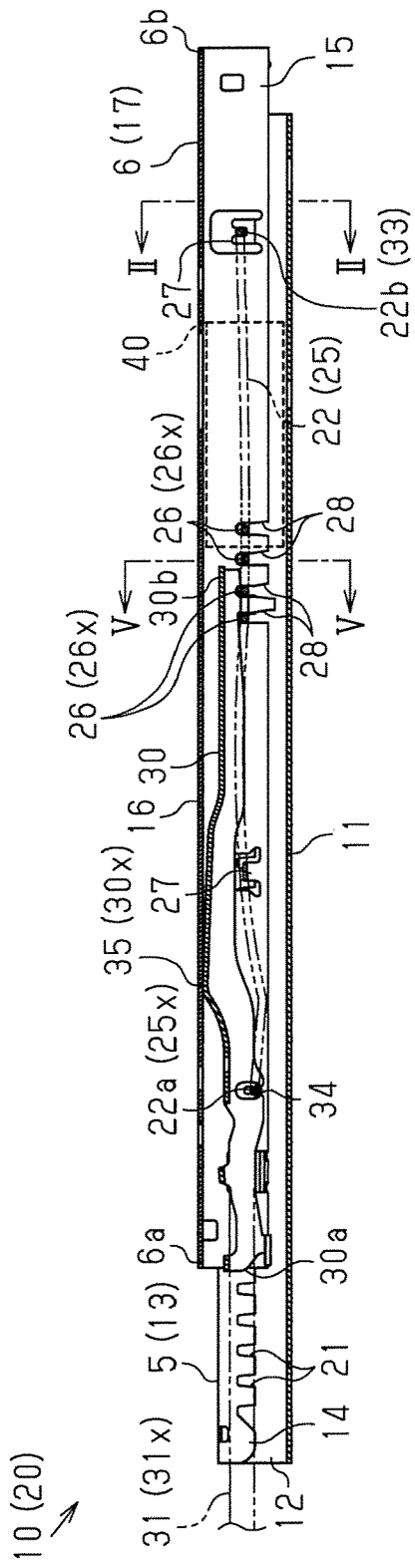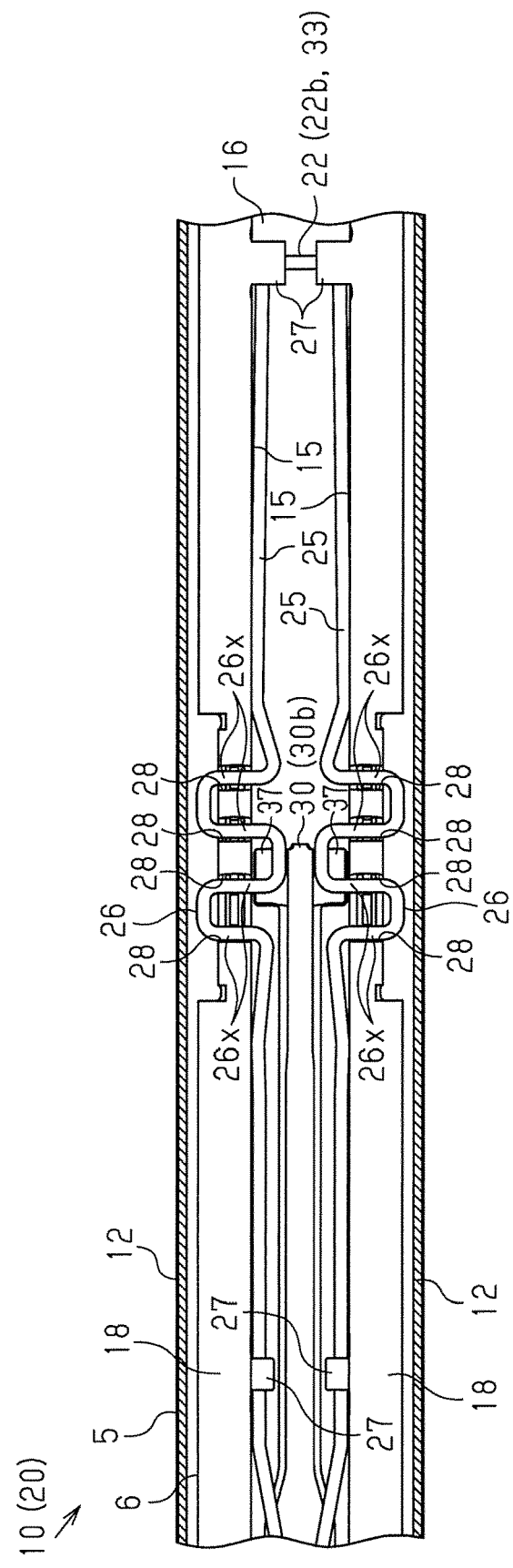

Initial Position

Unlock Position

VEHICLE SEAT SLIDE DEVICE

BACKGROUND

1. Field

The present disclosure relates to a vehicle seat slide device.

2. Description of Related Art

A typical vehicle seat slide device includes an upper rail, a lower rail, and a lock mechanism. The upper rail supports a seat located above the upper rail. The lower rail supports the upper rail so that the upper rail and lower rail are movable relative to each other. The lock mechanism restricts movement of the upper rail relative to the lower rail. Such a seat slide device may also include a lock release mechanism allowing the lock mechanism to perform an unlocking action with an operation force input through a transmitting member.

Japanese Laid-Open Patent Publication No. 2018-52207 discloses an example of a lock release mechanism that includes a lever member pivoted when pulled by a wire cable that transmits an operation force based on a forward tilting operation of a seat back performed in cooperation with a reclining device. Specifically, the lock release mechanism holds the lever member with a support bracket arranged on the upper rail. The upper rail includes a hole, which is open upward. The lever member downwardly pushes an unlock element (lock member) of the lock mechanism, which is arranged inside the upper rail, through the hole to unlock the lock mechanism and permit movement of the upper rail relative to the lower rail.

The lock release mechanism uses the elastic force of a spring member, which is held together with the lever member on the support bracket, to urge the lever member in a direction opposite to the pivoting direction in which the lever member is pulled by the wire cable. This eliminates the operation force applied through the wire cable so that the lever member does not push the unlock element of the lock mechanism. Consequently, the lock mechanism is returned to a lock state, which restricts relative movement of the upper rail, to fix the slide position of the seat.

With the above structure according to the conventional technique, however, components of the lock release mechanism located upward from the upper rail have a tendency to interfere with the seat. Foreign material or dust collected under the seat may affect the components and hinder stable operation of the lock release mechanism. Thus, there is still room for improvement in this respect.

SUMMARY

It is an objective of the present disclosure to provide a vehicle seat slide device that operates stably without interfering with the seat.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a vehicle seat slide device includes an upper rail, a lower rail, a lock mechanism, and a lock release mechanism. The upper rail supports a seat located above the upper rail. The lower rail supports the upper rail so that the upper rail is movable relative to the lower rail. The lock mechanism restricts movement of the upper rail relative to the lower rail. The lock release mechanism permits movement of the upper rail relative to the lower rail by performing an unlocking action with the lock mechanism based on an operation force received from a transmitting member. The upper rail includes two side walls, which are opposed to each other in a widthwise direction of the upper rail, and an upper wall, which connects the two side walls. The lock release mechanism includes a lever member, a push portion, and a spring member. The lever member includes a connecting portion to which the transmitting member is connected. The push portion pushes an unlock element of the lock mechanism and performs an unlocking action with the lock mechanism when the lever member is pivoted based on the operation force. The spring member applies an urging force to the lever member in a direction opposite to the direction in which the lever member is pivoted based on the operation force. The spring member includes an engagement end, which engages the lever member, and a spring body. At least the spring body is arranged in an inner space of the upper rail defined below the upper wall.

Other features and aspects will be apparent from the following detailed description, the drawings, and the claims.

BRIEF DESCRIPTION OF THE DRAWINGS

FIG. 4A is a cross-sectional view of the seat slide device (taken along line IVa-IVa in FIG. 2).

FIG. 4B is a bottom view of the seat slide device.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a vehicle seat slide device will now be described with reference to the drawings.

Figure 1:
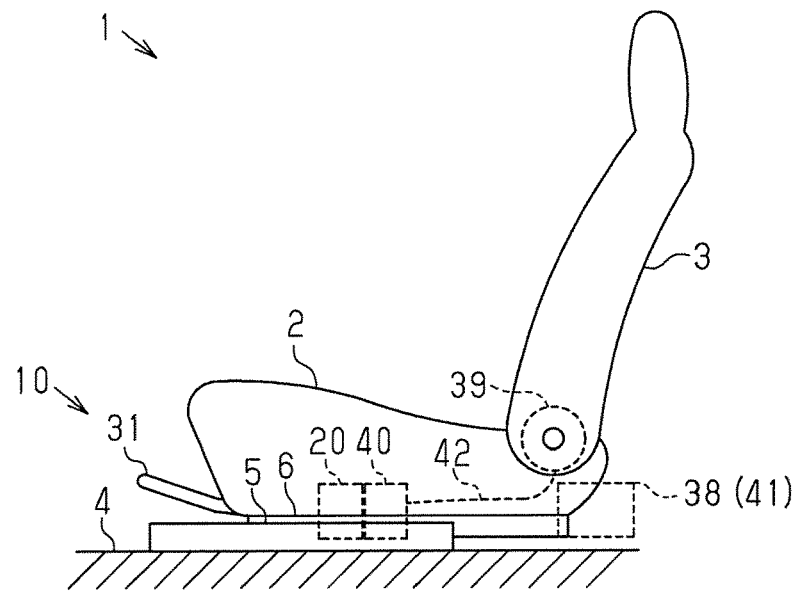
FIG. 1 is a schematic view of a vehicle seat and a seat slide device.

As shown in FIG. 1, a vehicle seat 1 includes a seat cushion 2 and a seat back 3 arranged at the rear end of the seat cushion 2 in an inclinable manner. Right and left lower rails 5, which extend in the front-rear direction of the vehicle (right-left direction in FIG. 1), are arranged on a vehicle floor 4. For the sake of brevity, only one of the two lower rails 5 is shown in FIG. 1 and the other drawings. Further, an upper rail 6, which moves on the lower rail 5 relative to the lower rail 5 in a direction in which the lower rail 5 extends (longitudinal direction), is attached to each lower rail 5. The seat 1 is supported above the upper rails 6.

A vehicle with the seat 1 of the present embodiment includes a seat slide device 10 formed by the lower rails 5 and the upper rails 6. The seat slide device 10 allows the seat 1 to be positioned in the front-rear direction of the vehicle. That is, the seat slide device 10 allows the slide position of the seat 1 to be adjusted.

Figure 2:
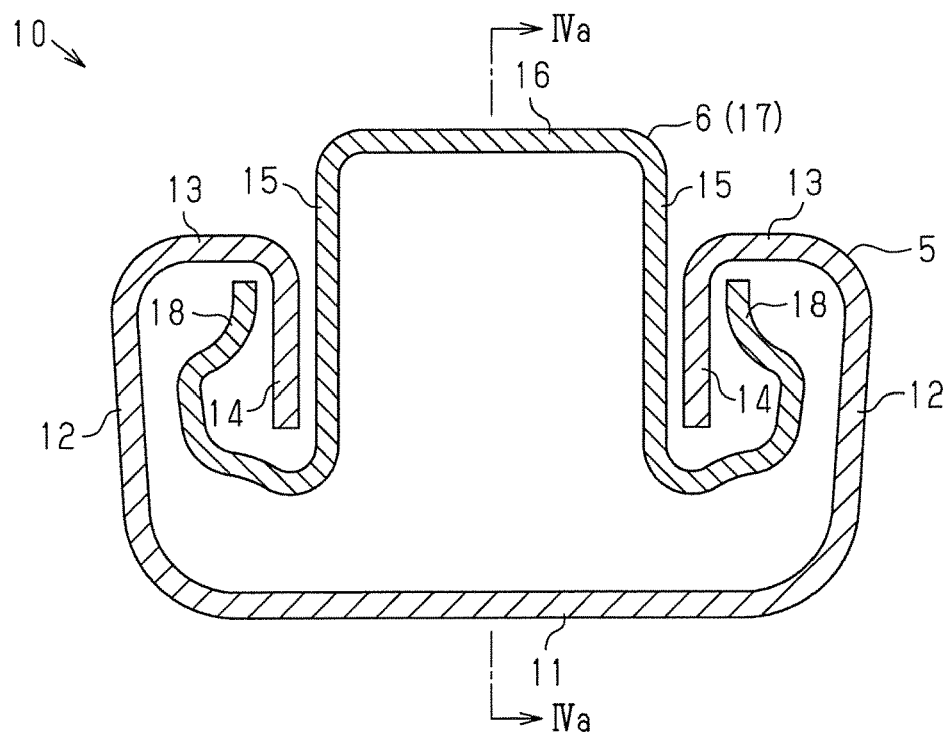
FIG. 2 is a cross-sectional view of the seat slide device (taken along line II-II in FIG. 4A).
Figure 3:
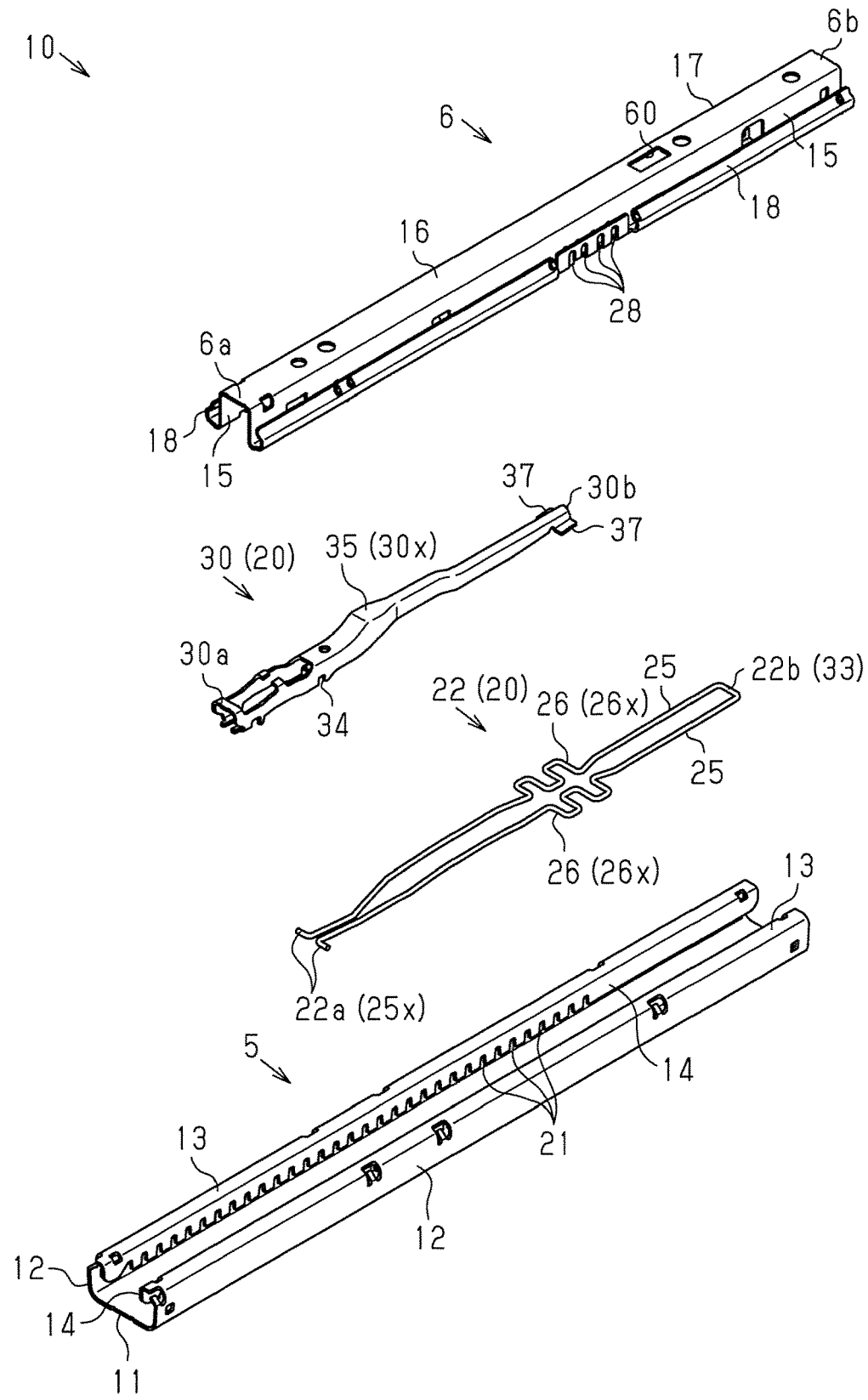
FIG. 3 is an exploded perspective view of the seat slide device.

Specifically, as shown in FIGS. 2 and 3, the lower rail 5 includes a substantially flat bottom wall 11, which serves as a fixing portion fixed to the vehicle floor 4 (refer to FIG. 1). An outer wall 12 extends from the bottom wall 11 at the ends in the widthwise direction (right-left direction in FIG. 2). Further, flanged upper walls 13 extend inward from the upper ends of the outer walls 12 (ends at the upper sides in FIG. 2) in the widthwise direction. The distal ends of the upper walls 13 are bent so that inner walls 14 extend downward.

The upper rail 6 includes two side walls 15, which are opposed to each other in the widthwise direction. The upper rail 6 also includes a flat upper wall 16 connecting the side walls 15. The upper rail 6 in the present embodiment is coupled to the lower rail 5 so that a body 17, which is defined by the side walls 15 and the upper wall 16 that form a substantially U-shaped cross section, is located between the inner walls 14 of the lower rail 5.

Further, in the upper rail 6 according to the present embodiment, the lower ends of the side walls 15 are bent so that bent portions 18 extend outward in the widthwise direction. The bent portions 18 are arranged in a space defined by the outer walls 12, the upper walls 13, and the inner walls 14 of the lower rail 5 to restrict movement in the upward and widthwise directions relative to the lower rail 5.

Spherical rolling elements (not shown) are located between each outer wall 12 of the lower rail 5 and the corresponding bent portion 18 of the upper rail 6, which are opposed to each other in the widthwise direction as described above. The rolling elements contact and roll along the outer walls 12 of the lower rail 5 and the bent portions 18 of the upper rail 6 so that the upper rail 6 moves smoothly relative to the lower rail 5 in the seat slide device 10 according to the present embodiment.

Further, as shown in FIGS. 3 to 6, the seat slide device 10 according to the present embodiment includes a lock mechanism 20 that restricts and allows movement of the upper rail 6 relative to the lower rail 5.

Figure 5:
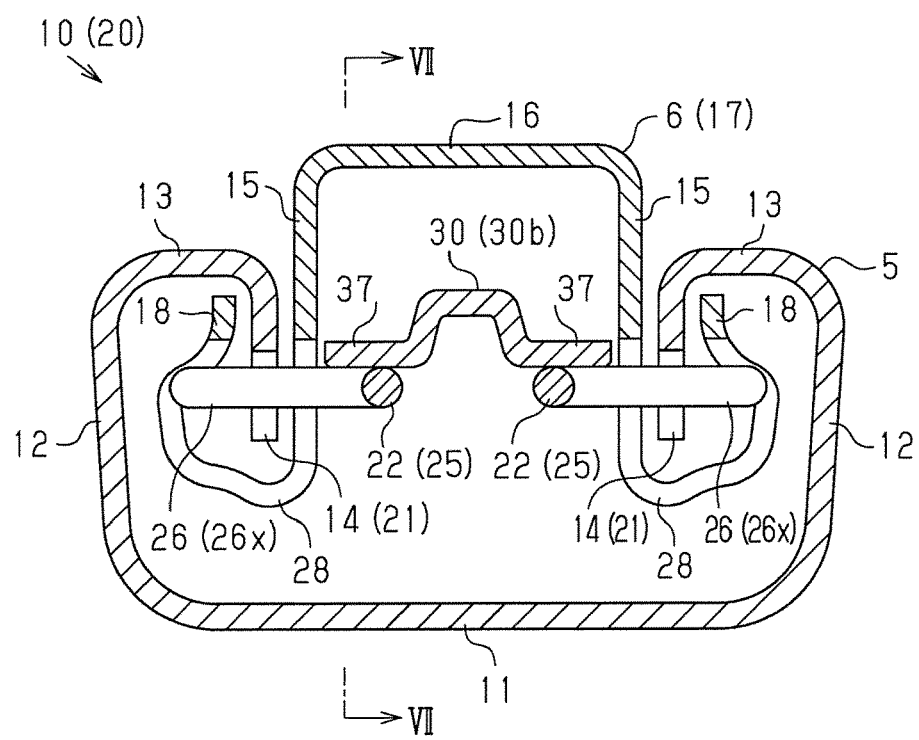
FIG. 5 is a cross-sectional view of the seat slide device in a lock state (taken along line V-V in FIG. 4A).
Figure 6:
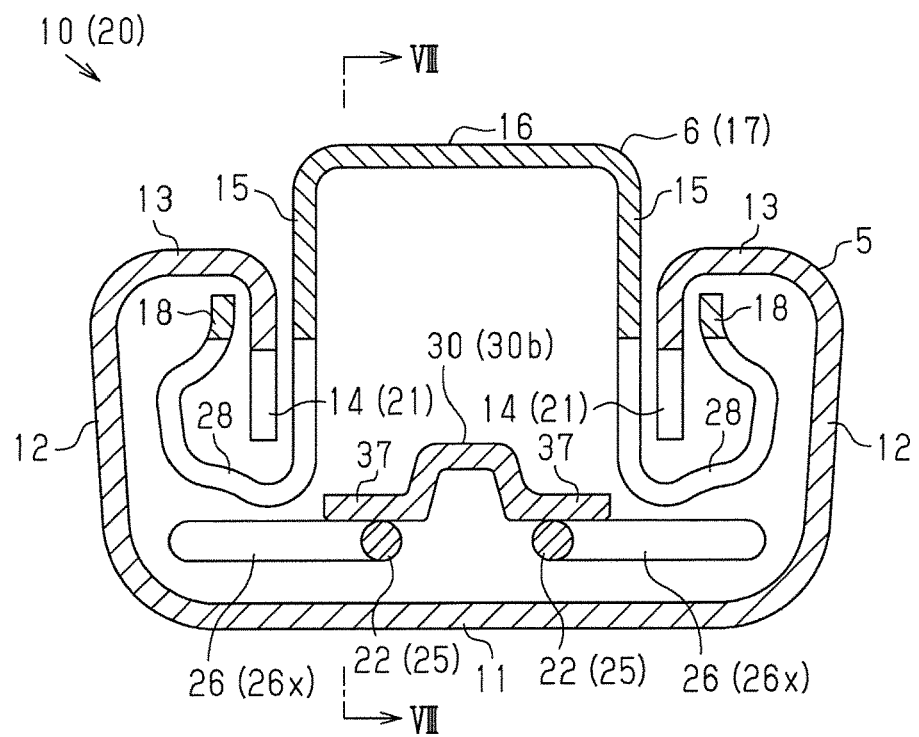
FIG. 6 is a cross-sectional view of the seat slide device in an unlock state (taken along line V-V in FIG. 4A).

Specifically, the lower rail 5 according to the present embodiment includes engagement grooves 21 arranged next to one another in the longitudinal direction of the lower rail 5 (right-left direction in FIG. 4A and direction perpendicular to the planes of FIGS. 5 and 6). In the lower rail 5 according to the present embodiment, the engagement grooves 21 are arranged at equal intervals by cutting out slits in the lower ends of the inner walls 14, which extend downward from the distal ends of the upper walls 13. The lock mechanism 20 according to the present embodiment includes a lock spring 22 that engages the engagement grooves 21 in a state supported by the upper rail 6.

Specifically, the lock spring 22 according to the present embodiment includes two spring portions 25 formed by bending a wire into two. The spring portions 25 of the lock spring 22 are arranged inside the body 17 to extend in the longitudinal direction of the upper rail 6. Each spring portion 25 includes a crank-shaped undulation 26, which is formed by bending the spring portion 25 a number of times at a substantially right angle. The undulations 26 of the lock spring 22 according to the present embodiment engage the engagement grooves 21 arranged on the lower rail 5.

More specifically, as shown in FIGS. 4A and 4B, the upper rail 6 according to the present embodiment includes holding portions 27 that support the spring portions 25 of the lock spring 22, which is arranged inside the body 17, from below. The holding portions 27 of the upper rail 6 according to the present embodiment are formed by partially cutting out the side walls 15 of the upper rail 6 and bending the cut-out parts of the side walls 15 to extend inward in the widthwise direction of the upper rail 6. Thus, the holding portions 27 extend inward from the side walls 15 in the U-shaped cross section of the upper rail 6.

Further, as shown in FIGS. 3 to 6, the undulations 26 in the spring portions 25 of the lock spring 22 according to the present embodiment include widthwise extensions 26$x$ (four in the present embodiment) that extend in the widthwise direction of the upper rail 6. The upper rail 6 according to the present embodiment includes insertion holes 28 (four in the present embodiment) formed by cutting out slits in lower portions of the side walls 15 and the bent portions 18.

As shown in FIGS. 4A to 5, the lock spring 22 according to the present embodiment is held by the upper rail 6 in a state in which the widthwise extensions 26$x$, which are formed by the undulations 26 of the spring portions 25, are arranged inside the insertion holes 28, which are formed in the upper rail 6. The widthwise extensions 26x of the lock spring 22 projecting outward from the body 17 in the widthwise direction of the upper rail 6 through the insertion holes 28 are arranged in the engagement grooves 21 formed in the lower rail 5. Thus, the lock spring 22, which is held by the upper rail 6, engages the engagement grooves 21 of the lower rail 5 so that the lock mechanism 20 according to the present embodiment restricts movement of the upper rail 6 relative to the lower rail 5 in the longitudinal direction, or the slide movement of the seat 1.

As shown in FIGS. 3 to 6, the lock mechanism 20 according to the present embodiment includes an unlock lever 30 having the form of a substantially elongated bar extending in the longitudinal direction of the upper rail 6. Further, the lock mechanism 20 according to the present embodiment includes a loop handle 31 (refer to FIG. 1) connected to the unlock lever 30 in a state located frontward from the seat 1. The lock mechanism 20 according to the present embodiment disengages the lock spring 22 from the engagement grooves 21 of the lower rail 5 when an operation force is input to the loop handle 31 and transmitted to the lock spring 22 by the unlock lever 30.

Specifically, as shown in FIG. 4A, the unlock lever 30 according to the present embodiment overlaps the lock spring 22, which is arranged inside the body 17, from above at a first end 6a of the upper rail 6 located at the front of the vehicle (left side in FIG. 4A).

As shown in FIGS. 3 and 4A, the lock spring 22 according to the present embodiment has a first end 22a arranged at a first end 6a of the upper rail 6, and the first end 22a serves as release ends 25x of the two spring portions 25. The lock spring 22 also has a second end 22b serving as a connecting portion 33 of the two spring portions 25 so that a portion (right side in FIG. 4B) corresponding to a second end 6b of the upper rail 6 arranged toward the rear of the vehicle has a substantially U-shaped bent form. In the lock mechanism 20 according to the present embodiment, the release ends 25x of the two spring portions 25 of the lock spring 22 are each engaged with grooves 34 formed in a lower end of the unlock lever 30.

Further, the unlock lever 30 according to the present embodiment includes a projection 35 that defines a pivotal fulcrum 30x of the unlock lever 30 when abutting against the upper wall 16 of the upper rail 6 from below (lower side in FIG. 4A). A first end 30a of the unlock lever 30 located at the first end 6a of the upper rail 6 is connected to an inserted portion 31x of the loop handle 31 that is inserted into the body 17 from the first end 6a of the upper rail 6. A second end 30b of the unlock lever 30 according to the present embodiment, which is located toward the rear of the vehicle, is arranged above the undulations 26 of the spring portions 25 of the lock spring 22.

With the lock mechanism 20 according to the present embodiment, when the loop handle 31 is lifted, the first end 30a of the unlock lever 30 connected to the loop handle 31 is moved upward. This pivots the unlock lever 30 about the pivotal fulcrum 30x (clockwise in FIG. 4A). Further, as shown in FIG. 6, the pivoting downwardly moves the second end 30b of the unlock lever 30, which lowers the lock spring 22 in abutment with the undulations 26 of the spring portions 25. This flexes the lock spring 22 so that the lock mechanism 20 according to the present embodiment disengages the lock spring 22 from the engagement grooves 21 of the lower rail 5.

Specifically, the unlock lever 30 of the present embodiment includes substantially flat push portions 37 at the second end 30b, which extend to the sides in the widthwise direction of the upper rail 6. The lock spring 22 of the present embodiment is configured to move downward while maintaining a state in which undulations 26 of the spring portions 25 pushed by the push portions 37 are substantially parallel to the upper wall 16 of the upper rail 6 (substantially horizontal state). That is, the widthwise extensions 26x of the undulations 26 of the lock spring 22 according to the present embodiment are downwardly separated from the engagement grooves 21 of the lower rail 5. The lock mechanism 20 according to the present embodiment allows the upper rail 6 to move relative to the lower rail 5 in the longitudinal direction by disengaging the lock spring 22 from the lower rail 5 through an unlocking action.

The seat slide device 10 according to the present embodiment allows for adjustment of the slide position of the seat 1 with the lock mechanism 20 by keeping the loop handle 31 lifted. When the user releases the loop handle 31, the seat 1 can be fixed at the desired slide position.

Lock Release Mechanism

A lock release mechanism of the seat slide device 10 according to the present embodiment will now be described.

As shown in FIG. 1, the seat slide device 10 according to the present embodiment includes a lock release mechanism 40 that cooperates with a reclining device (recliner) 39 to perform an unlocking action with the lock mechanism 20 when an operation unit 38 arranged on the seat 1 is operated.

Specifically, the seat 1 according to the present embodiment includes a foot lever 41, which serves as the operation unit 38, at the rear lower side of the seat cushion 2. Further, the reclining device 39 of the seat 1 according to the present embodiment tilts the seat back 3 forward when the foot lever 41 is operated. An operation force input to the foot lever 41 is transmitted by a wire cable 42 to the lock release mechanism 40. This implements a walk-in function that allows for adjustment of the slide position of the seat 1 according to the present embodiment while the seat back 3 is tilted forward.

Figure 7:
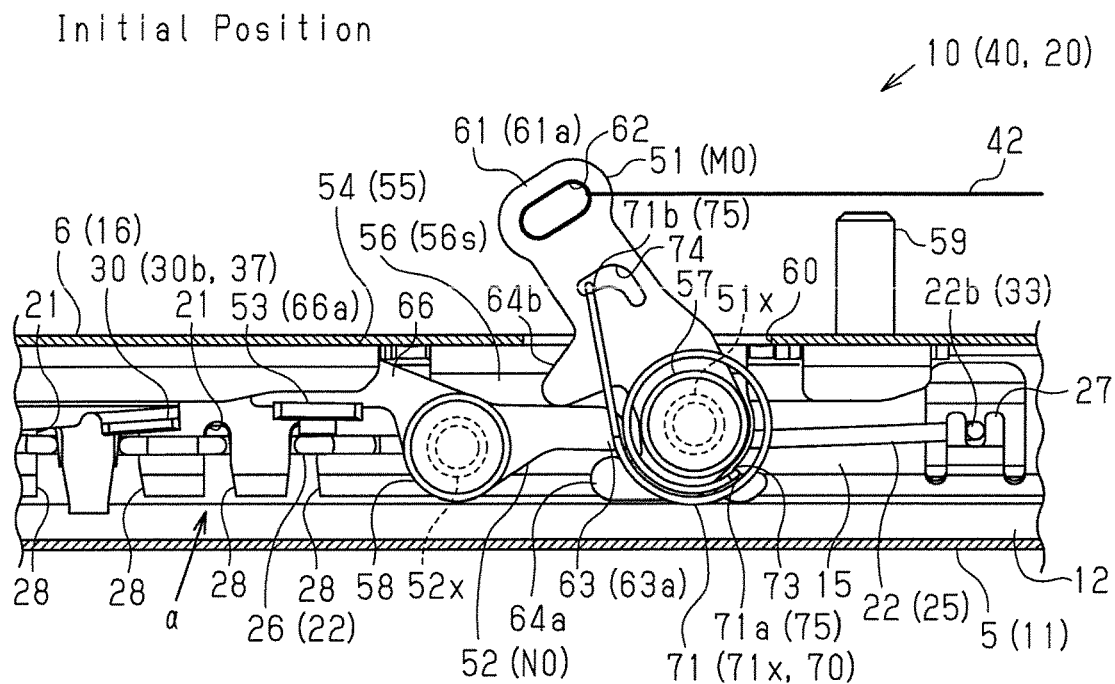
FIG. 7 is a cross-sectional view of a seat slide device in a lock state according to a first embodiment (taken along VII-VII in FIG. 5).
Figure 8:
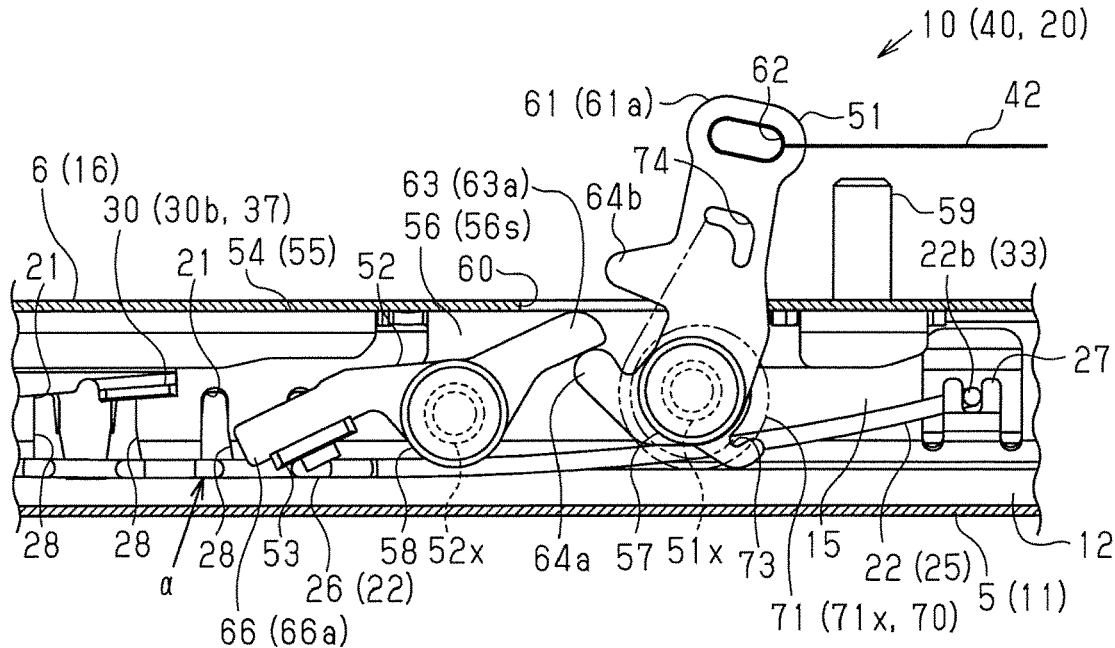
FIG. 8 is a cross-sectional view of the seat slide device in an unlock state according to the first embodiment (taken along VIII-VIII in FIG. 6).
Figure 9:
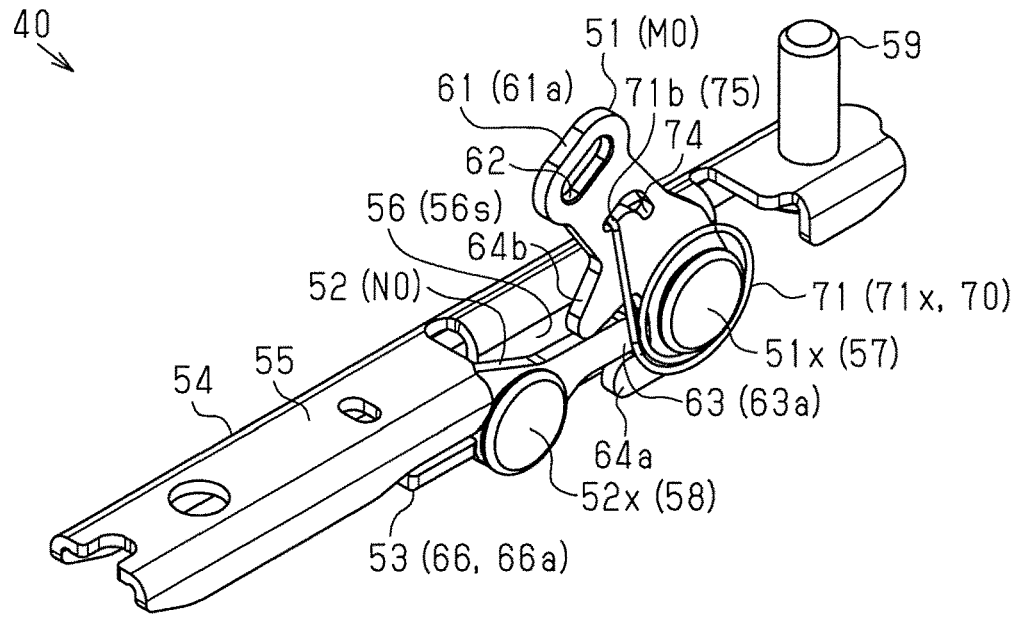
FIG. 9 is a perspective view of a lock release mechanism according to the first embodiment.

As shown in FIGS. 7 and 8, the lock release mechanism 40 according to the present embodiment includes an input lever 51 connected to the wire cable 42. The lock release mechanism 40 also includes an engagement lever 52 that engages the input lever 51. The engagement lever 52 includes a push portion 53 that is moved downward (downward in FIGS. 7 and 8) when the engagement lever 52 is pivoted in cooperation with the input lever 51 based on an operation force input to the input lever 51 through the wire cable 42 serving as a transmitting member. The lock release mechanism 40 according to the present embodiment is configured to perform an unlocking action with the lock mechanism 20 when the push portion 53 lowers the lock spring 22, which serves as an unlock element.

As shown in FIGS. 7 to 11, the lock release mechanism 40 according to the present embodiment includes a support bracket 54 that pivotally supports the input lever 51 and the engagement lever 52 in inner space α defined below the upper wall 16 by the side walls 15 of the upper rail 6 and the upper wall 16.

The support bracket 54 according to the present embodiment includes a base wall 55 secured to the upper wall 16 of the upper rail 6 and a support wall 56 that extends downward from the base wall 55. The support bracket 54 according to the present embodiment is formed by processing a sheet of metal. The base wall 55 has the form of a substantially elongated plate, which extends in the longitudinal direction of the upper rail 6 (right-left direction in FIGS. 7, 8, 10, and 11) and is bent downward from ends in the widthwise direction. The support wall 56 is formed by partially cutting out (away) the substantially plate-shaped base wall 55 from one end (upper end in FIG. 10) in the widthwise direction of the base wall 55. The support bracket 54 according to the present embodiment pivotally supports the input lever 51 and the engagement lever 52 using pivot shafts 51x, 52x arranged in the support wall 56.

Figure 10:
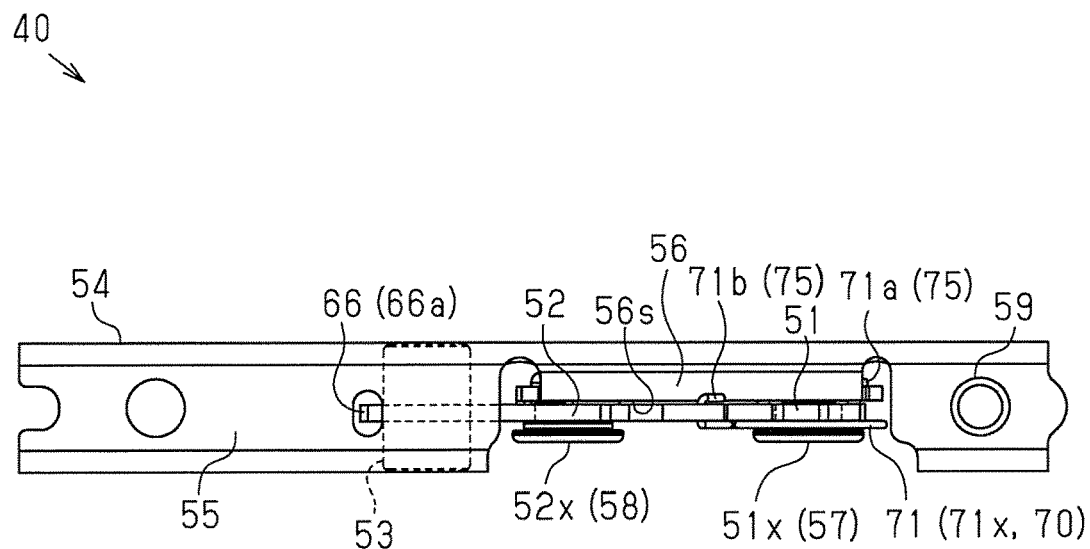
FIG. 10 is a plan view of the lock release mechanism according to the first embodiment.

In the support bracket 54 according to the present embodiment, the pivot shafts 51x, 52x are formed by inserting rivet-shaped shaft members 57, 58 into the support wall 56, which extends in the longitudinal direction and the vertical direction of the upper rail 6, in the thickness direction of the support wall 56 or the widthwise direction of the upper rail 6 (vertical direction as viewed in FIG. 10). The support bracket 54 according to the present embodiment is configured to arrange the input lever 51 and the engagement lever 52, which are pivotally supported respectively by the pivot shafts 51x, 52x, in the longitudinal direction of the upper rail 6. The support bracket 54 according to the present embodiment is attached to the upper rail 6 and secured to the upper wall 16 from below with the input lever 51 arranged toward the rear of the vehicle from the engagement lever 52 (right side in FIGS. 7 and 8).

In the seat slide device 10 according to the present embodiment, the location where the support bracket 54 is fixed to the upper wall 16 of the upper rail 6 is set to overlap where a stud bolt 59 that fixes the seat 1 to the upper rail 6 is arranged. The base wall 55 of the support bracket 54 according to the present embodiment is fastened to the upper wall 16 of the upper rail 6 using the stud bolt 59.

The upper rail 6 according to the present embodiment includes a hole 60, which extends through the upper wall 16. The hole 60 is arranged above the pivot shaft 51x of the input lever 51 held by the support bracket 54 and arranged in inner space α below the upper wall 16 of the upper rail 6. The input lever 51 according to the present embodiment includes a lever portion 61 projecting upward out of the upper rail 6 through the hole 60. The lever portion 61 includes a distal end 61a that has a hole 62, which serves as a connecting portion to which the wire cable 42 is connected.

The engagement lever 52 according to the present embodiment includes a first lever portion 63 extending toward the rear of the vehicle to the input lever 51. The input lever 51 according to the present embodiment includes a first engaging projection 64a and a second engaging projection 64b projecting toward the front of the vehicle (left side in FIGS. 7 and 8) sandwiching the distal end 63a of the first lever portion 63 in the vertical direction. The engagement lever 52 according to the present embodiment is pivoted in cooperation with the input lever 51 when the distal end 63a of the first lever portion 63 is engaged with the first engaging projection 64a and the second engaging projection 64b.

More specifically, when the input lever 51 is pivoted in a direction in which the first engaging projection 64a and the second engaging projection 64b of the input lever 51 are moved upward (clockwise in FIGS. 7 and 8), the first lever portion 63 of the engagement lever 52 according to the present embodiment is pivoted (counterclockwise in FIGS. 7 and 8) and raised by the first engaging projection 64a, which is located downward from the first lever portion 63. When the input lever 51 is pivoted in a direction in which the first engaging projection 64a and the second engaging projection 64b of the input lever 51 are moved downward (counterclockwise in FIGS. 7 and 8), the first lever portion 63 is pivoted and pushed downward (clockwise in FIGS. 7 and 8) by the second engaging projection 64b, which is located upward from the first lever portion 63.

The engagement lever 52 according to the present embodiment also includes a second lever portion 66 extending toward the opposite side of the first lever portion 63 from the pivot shaft 52x. Specifically, the second lever portion 66 extends from the rear toward the front of the vehicle so that a distal end 66a is arranged above the undulations 26 of the lock spring 22 of the lock mechanism 20, that is, above a portion where the lock spring 22 engages the engagement grooves 21 of the lower rail 5. The distal end 66a of the second lever portion 66 of the engagement lever 52 according to the present embodiment includes a push portion 53 that pushes the lock spring 22.

The input lever 51 according to the present embodiment is pivoted in the direction in which the first engaging projection 64a raises the first lever portion 63 of the engagement lever 52 when an operation force is input through the wire cable 42. When the engagement lever 52 according to the present embodiment is pivoted in cooperation with the input lever 51, the push portion 53 of the second lever portion 66 is moved downward in inner space α at the lower side of the upper wall 16 of the upper rail 6. The push portion 53 of the lock release mechanism 40 according to the present embodiment lowers the undulations 26 of the lock spring 22, which are located below the push portion 53, and separates the undulations 26 from the engagement grooves 21 of the lower rail 5 to perform an unlocking action with the lock mechanism 20.

The push portion 53 according to the present embodiment has a substantially flat form and extends in the widthwise direction of the upper rail 6. The lock release mechanism 40 according to the present embodiment allows the push portion 53 to stably lower the lock spring 22.

Further, in the seat slide device 10 according to the present embodiment, the wire cable 42 extends toward the rear of the vehicle in a state connected to the lever portion 61 of the input lever 51, which projects upward out of the upper rail 6. The input lever 51 according to the present embodiment is pivoted by an operation force transmitted through the wire cable 42 when the lever portion 61 is pulled by the wire cable 42.

The lock release mechanism 40 according to the present embodiment further includes a spring member 70 that applies an urging force to the input lever 51 in a direction (counterclockwise in FIGS. 7 and 8) opposite to the direction in which the input lever 51 is pivoted by an operation force input through the wire cable 42. The input lever 51 of the lock release mechanism 40 according to the present embodiment is configured to be returned to initial position M0 by the urging force of the spring member 70 when an operation force is not input through the wire cable 42.

The seat 1 according to the present embodiment is in a state in which the wire cable 42 does not pull the lever portion 61 of the input lever 51 when the foot lever 41 (refer to FIG. 1) is operated to raise the forward-tilted seat back 3. With the lock release mechanism 40 according to the present embodiment, when the urging force of the spring member 70 pivots the input lever 51 and the engagement lever 52 pivots in cooperation with the pivotal movement of the input lever 51, the push portion 53 of the second lever portion 66 is moved upward. The seat slide device 10 according to the present embodiment fixes the slide position of the seat 1 when the lock mechanism 20 returns to a lock state that restricts movement of the upper rail 6 relative to the lower rail 5.

Specifically, as shown in FIGS. 9 to 13A and 13B, the lock release mechanism 40 according to the present embodiment includes a torsion spring 71. The torsion spring 71 serves as the spring member 70 and includes a helical spring body 71x. The torsion spring 71 applies an urging force to the input lever 51 in a state in which the spring body 71x is fitted onto the pivot shaft 51x of the input lever 51, that is, in a state in which the pivot shaft 51x is arranged inside the helical form. The lock release mechanism 40 according to the present embodiment is configured to arrange the spring body 71x of the torsion spring 71, which has a unique elastically deformed shape to apply an urging force to the input lever 51, in inner space α below the upper wall 16 of the upper rail 6.

The support bracket 54 according to the present embodiment integrally holds the input lever 51, the engagement lever 52 including the push portion 53 for the lock spring 22, and the torsion spring 71. The lock release mechanism 40 according to the present embodiment is thus coupled as a unit to the seat slide device 10.

The torsion spring 71 according to the present embodiment is formed by processing a metal wire. The torsion spring 71 includes a first end 71a, which is engaged with a first engagement portion 73 of the support bracket 54, and a second end 71b, which is engaged with a second engagement portion 74 arranged on the input lever 51. The second end 71b of the torsion spring 71 forms an engagement end that is engaged with the input lever 51, which serves as a lever member. The first end 71a and the second end 71b each include a bent portion 75 that is bent in a direction (from lower side toward upper side in FIG. 12) parallel to the pivot shaft 51x of the input lever 51 onto which the spring body 71x of the torsion spring 71 is fitted. Thus, distal ends 75a of the first end 71a and the second end 71b extend in the same direction (rightward in FIG. 12). The torsion spring 71 according to the present embodiment allows the first end 71a and the second end 71b to be coupled to and engaged with the first engagement portion 73 of the support bracket 54 and the second engagement portion 74 of the input lever 51 in the same direction.

Figure 12:
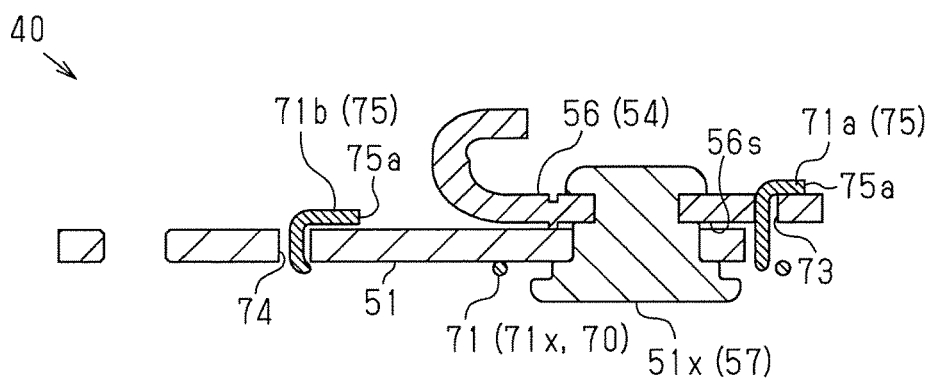
FIG. 12 is a cross-sectional view of the lock release mechanism according to the first embodiment (taken along line XII-XII in FIG. 11).

Specifically, as shown in FIG. 12, in the lock release mechanism 40 according to the present embodiment, the support wall 56, which includes the pivot shaft 51x, the input lever 51, and the spring body 71x of the torsion spring 71 are aligned in the axial direction (vertical direction as viewed in FIG. 12) of the pivot shaft 51x. To allow for such an arrangement, the bent portions 75 in the first end 71a and the second end 71b of the torsion spring 71 are bent in the direction in which the input lever 51 and the torsion spring 71 are coupled (from lower side toward upper side in FIG. 12) and arranged along a support surface 56s (lower side in FIG. 12) of the support wall 56.

As shown in FIGS. 11 to 13A and 13B, the support bracket 54 and the input lever 51 according to the present embodiment include a first engagement portion 73 and a second engagement portion 74 at locations that sandwich the pivot shaft 51x of the input lever 51 in the radial direction in a state in which the input lever 51 is in initial position M0 (refer to FIG. 7). In the lock release mechanism 40 according to the present embodiment, the first end 71a and the second end 71b of the torsion spring 71 are engaged with the first engagement portion 73 of the support bracket 54 and the second engagement portion 74 of the input lever 51 at pivotal positions of the input lever 51. The distal ends 75a of the bent portions 75 of the torsion spring 71 according to the present embodiment are configured to substantially extend in the same radial direction of the pivot shaft 51x, more specifically, in a direction connecting the first engagement portion 73 and the second engagement portion 74, that is, toward the lower side of the support bracket 54 (diagonally downward right in FIG. 11).

Figure 11:
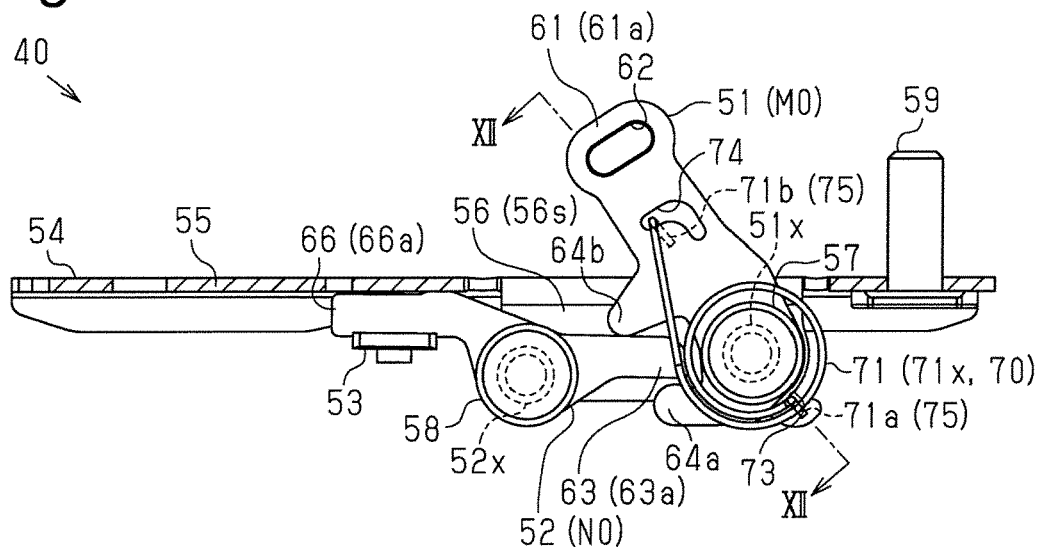
FIG. 11 is a side view of the lock release mechanism according to the first embodiment.
Figure 13A:
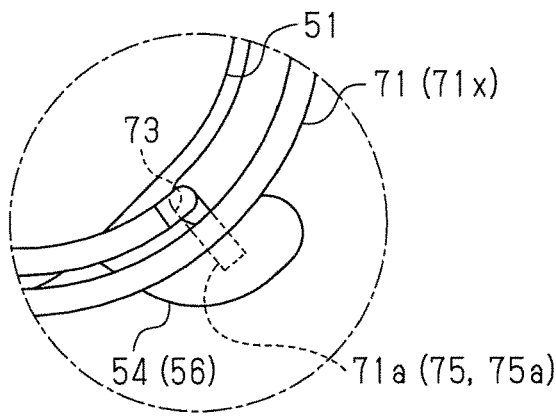
FIG. 13A is an enlarged view of a first engagement portion located on a support bracket and a bent portion in engagement with the first engagement portion.

As shown in FIGS. 11 and 13A, the first engagement portion 73 in the lock release mechanism 40 according to the present embodiment arranged on the support bracket 54 (i.e., support wall 56) is groove-shaped and open in a circumferential direction (diagonally upward right in FIG. 13A) of the pivot shaft 51x onto which the spring body 71x of the torsion spring 71 is fitted. The bent portion 75 in the first end 71a of the torsion spring 71 is engaged with the first engagement portion 73 in the opening direction.

Figure 13B:
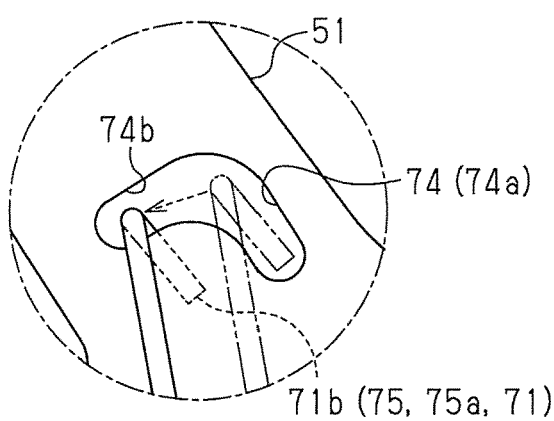
FIG. 13B is an enlarged view of a second engagement portion located on an input lever and a bent portion in engagement with the second engagement portion.

As shown in FIGS. 11 and 13B, the second engagement portion 74 arranged on the input lever 51 includes a first hole 74a extending in an extending direction of the bent portion 75 in a state in which the bent portion 75 of the second end 71b of the torsion spring 71 is engaged with the second engagement portion 74. In other words, in the lock release mechanism 40 according to the present embodiment, when engaging the bent portion 75 of the second end 71b with the second engagement portion 74 of the input lever 51, the bent portion 75 is inserted into the first hole 74a of the second engagement portion 74. The second engagement portion 74 includes a second hole 74b that is continuous with the first hole 74a and extended in the circumferential direction of the pivot shaft 51x. Specifically, the second hole 74b is continuous with a radial outer end of the first hole 74a and extended in the same direction (diagonally downward left in FIGS. 13A, 13B) as the direction in which the first engagement portion 73 is recessed in the support wall 56 of the support bracket 54. Further, the second engagement portion 74 is configured so that the bent portion 75 of the second end 71b inserted into the first hole 74a is held in the second hole 74b when the bent portion 75 is moved to the second hole 74b by the elastic force of the torsion spring 71. With the lock release mechanism 40 according to the present embodiment, the torsion spring 71 is easily coupled to the support bracket 54 together with the input lever 51 by applying pressure in advance to the torsion spring 71.

The support bracket 54 according to the present embodiment is configured so that the second lever portion 66 of the engagement lever 52 when pivoted by the urging force of the torsion spring 71 abuts the base wall 55 of the support bracket 54 from below. Thus, the lock release mechanism 40 according to the present embodiment is configured to hold the input lever 51 and the engagement lever 52 at initial positions M0 and N0, respectively.

The advantages of the present embodiment will now be described.

(1) The lock release mechanism 40 includes the input lever 51 and the push portion 53. The input lever 51 serves as the lever member including the connection portion to which the wire cable 42, which serves as the transmitting member, is connected. The push portion 53 pushes the lock spring 22, which serves as the unlock element, and unlocks the lock mechanism 20 when the input lever 51 is pivoted by an operation force input through the wire cable 42. The lock release mechanism 40 also includes the spring member 70 (71) that applies an urging force to the input lever 51 in a direction opposite to the direction in which the lock mechanism 20 is pivoted to perform an unlocking action. The spring member 70 also includes the engagement end (71b), which is engaged with the input lever 51, and the spring body (71x). In the lock release mechanism 40, the spring body (71x) is arranged in inner space α of the upper rail 6 defined below the upper wall 16.

According to the above structure, interference of the spring member 70 with the seat 1 is limited. Further, the spring body (71x) of the spring member 70, which is a movable member, is protected by the side walls 15 and the upper wall 16 of the upper rail 6. Thus, the spring body is not affected by foreign material collected under the seat 1. This ensures stable operation of the lock release mechanism 40. This also reduces openings formed in the upper rail 6 and maintains the rigidity of the upper rail 6 in a preferred manner.

(2) The spring member 70 employs the torsion spring 71 that applies an urging force to the input lever 51 in a state in which the helical spring body 71x is fitted onto the pivot shaft 51x of the input lever 51, which is arranged in inner space α defined below the upper wall 16 of the upper rail 6.

The use of the torsion spring 71 reduces the space occupied by the spring body 71x, which is arranged around the pivot shaft 51x of the input lever 51. The pivot shaft 51x is arranged in inner space α below the upper wall 16. This facilitates the arrangement of the spring body 71x, which is fitted onto the pivot shaft 51x, in the inner space α.

(3) The lock release mechanism 40 includes the support bracket 54 that integrally holds the input lever 51 and the torsion spring 71. This allows the input lever 51 and the torsion spring 71, which are held by the support bracket 54 as a unit, to be easily coupled to the upper rail 6.

(4) The torsion spring 71 includes the first end 71a, which engages the first engagement portion 73 of the support bracket 54, and the second end 71b, which engages the second engagement portion 74 of the input lever 51. The first end 71a and the second end 71b include the bent portions 75 bent in a direction parallel to the pivot shaft 51x of the input lever 51 onto which the spring body 71x is fitted. The distal ends 75a of the bent portions 75 extend in the same direction.

According to the above structure, when coupling the input lever 51 and the torsion spring 71 to the support bracket 54, the first end 71a and the second end 71b of the torsion spring 71 engage the first engagement portion 73 of the support bracket 54 and the second engagement portion 74 of the input lever 51 in the same direction. This improves the coupling efficiency.

(5) The second engagement portion 74 of the input lever 51 includes the first hole 74a extending in an extending direction of the bent portion 75 in a state in which the bent portion 75 at the second end 71b of the torsion spring 71 is engaged with the second engagement portion 74. The second engagement portion 74 includes the second hole 74b continuous with the first hole 74a and extending in the circumferential direction of the pivot shaft 51x of the input lever 51 onto which the spring body 71x of the torsion spring 71 is fitted.

With the above structure, the bent portion 75 inserted into the first hole 74a of the second engagement portion 74 is moved to the second hole 74b by the elastic force of the torsion spring 71 and held in the second hole 74b. As a result, the torsion spring 71 is easily coupled to the support bracket 54 together with the input lever 51 by applying pressure in advance to the torsion spring 71. Thus, the input lever 51 coupled to the support bracket 54 together with the torsion spring 71 is held at initial position M0 by the urging force of the torsion spring 71.

(6) The support bracket 54 is secured to the upper wall 16 of the upper rail 6 from below so that the connecting portion (hole 62 of lever portion 61) of the input lever 51 to which the wire cable 42 is connected is located above the upper rail 6 through the hole 60 in the upper wall 16.

With the above structure, in the state in which the pivot shaft 51x of the input lever 51 and the torsion spring 71 fitted onto the pivot shaft 51x are arranged in inner space α below the upper wall 16, the input lever 51 and the torsion spring 71, which are held by the support bracket 54 as a unit, are easily coupled to the upper rail 6. The wire cable is easily connected to the input lever 51. This improves the degree of freedom for the layout of the wire cable 42. Exposure of the input lever 51 through the hole 60 formed in the upper wall 16 of the upper rail 6 is minimized to ensure stable movement and maintain the rigidity of the upper rail 6 in a preferred manner.

(7) The lock release mechanism 40 includes the engagement lever 52 that engages the input lever 51 and is pivoted in cooperation with the input lever 51. The push portion 53 is arranged on the engagement lever 52.

With the above structure, a link ratio is optimized to produce stable movement with a small operation force. This improves operability when performing an unlocking action with the lock mechanism.

(8) The support bracket 54 integrally holds the input lever 51, the engagement lever 52, and the torsion spring 71. This easily couples the input lever 51, the engagement lever 52, and the torsion spring 71, which are held by the support bracket 54 as a unit, to the upper rail 6.

Second Embodiment

A second embodiment of a vehicle seat slide device will now be described with reference to the drawings. For illustrative purposes, like or the same reference numerals are given to those components that are like or the same as the corresponding components of the first embodiment. Such components will not be described in detail.

Figure 14:
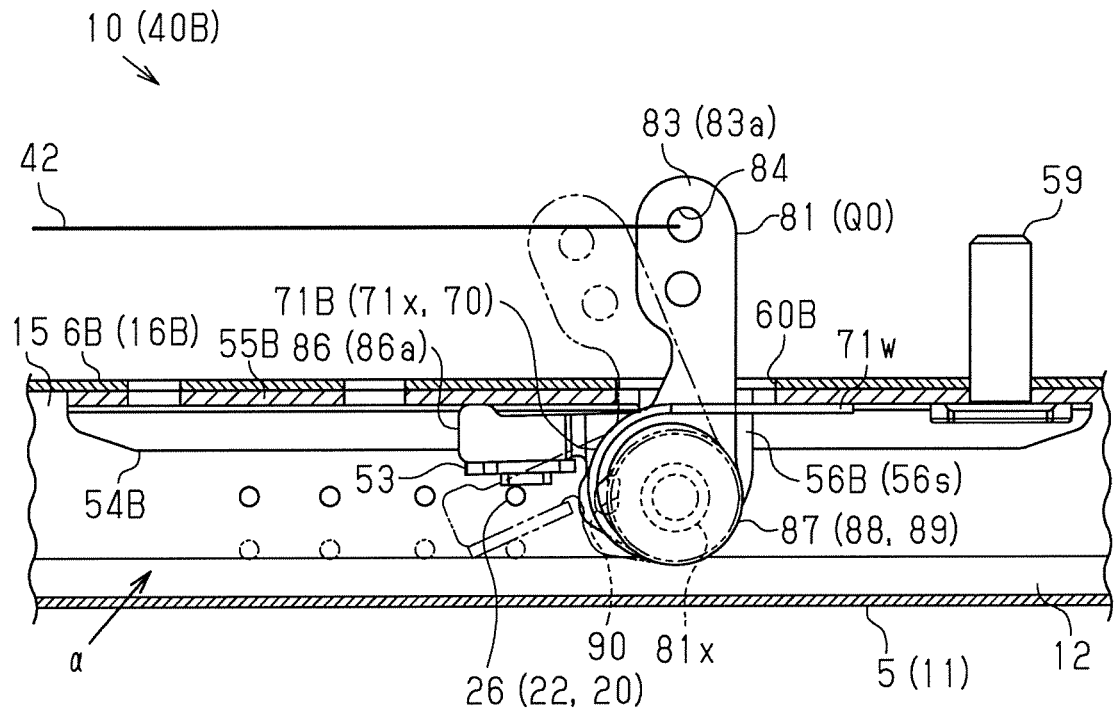
FIG. 14 is a cross-sectional view of a seat slide device showing the structure of a lock release mechanism according to a second embodiment.
Figure 15:
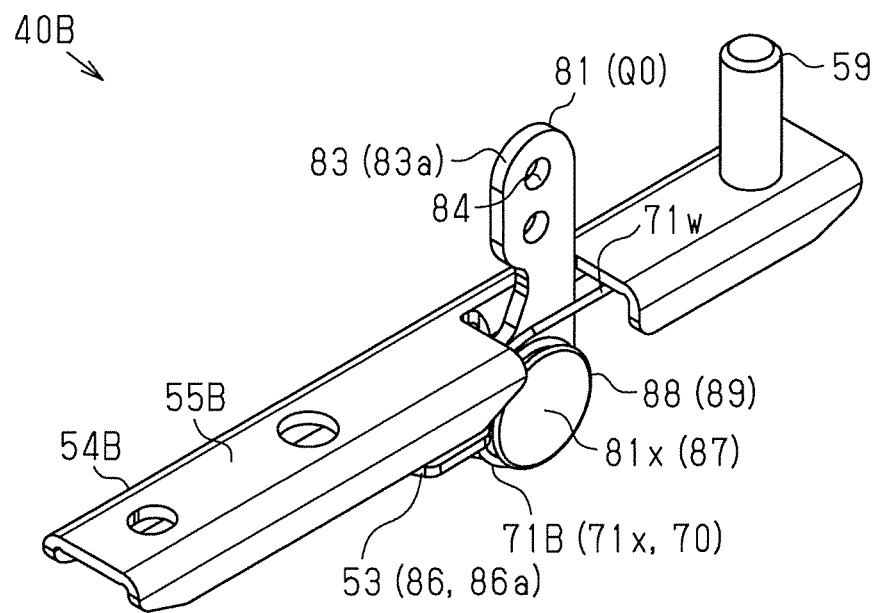
FIG. 15 is a perspective view of a lock release mechanism according to the second embodiment.
Figure 16:
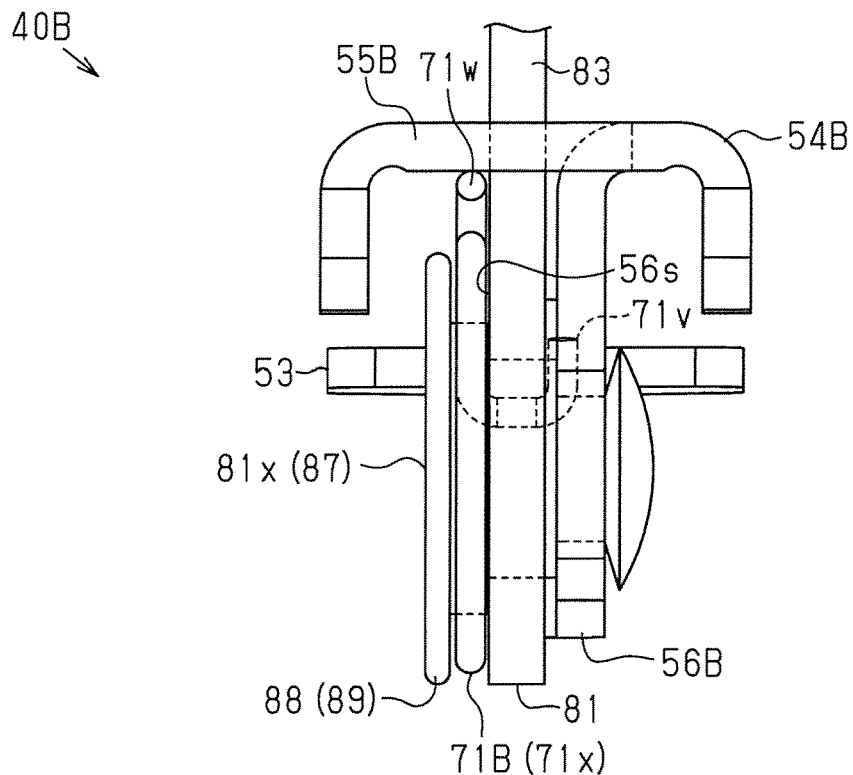
FIG. 16 is a front view of the lock release mechanism according to the second embodiment (view from rear of vehicle).

As shown in FIGS. 14 to 16, a lock release mechanism 40B according to the present embodiment includes a pivotal lever 81 that serves as a lever member and is pivotally supported by a pivot shaft 81x located in inner space α below an upper wall 16B of an upper rail 6B in the same manner as the input lever 51 of the above first embodiment. The pivotal lever 81 is pivoted by an operation force input through the wire cable 42 to perform an unlocking action with the lock mechanism 20.

Specifically, the pivotal lever 81 includes a first lever portion 83, which projects upward out of the upper rail 6B through a hole 60B in the upper wall 16B of the upper rail 6B in the same manner as the input lever 51 of the first embodiment. The first lever portion 83 includes a distal end 83a that has a hole 84, which serves as a connecting portion to which the wire cable 42 is connected.

The pivotal lever 81 includes a second lever portion 86 extending toward the front of the vehicle. The second lever portion 86 includes a distal end 86a above the undulations 26 of the lock spring 22 of the lock mechanism 20 in the same manner as the second lever portion 66 of the engagement lever 52 in the above first embodiment. The distal end 86a of the second lever portion 86 of the pivotal lever 81 includes the push portion 53 for the lock spring 22, which has the same shape as that in the above first embodiment.

As shown in FIG. 14, in the seat slide device 10 according to the present embodiment, the wire cable 42 extends toward the front of the vehicle (leftward in FIG. 14) in a state connected to the first lever portion 83 of the pivotal lever 81, which projects upward out of the upper rail 6. The pivotal lever 81 is pivoted (counterclockwise in FIG. 14) when the first lever portion 83 is pulled by the wire cable 42 so that the distal end 86a of the second lever portion 86 extending toward the front of the vehicle moves downward. In the lock release mechanism 40B according to the present embodiment, the push portion 53 arranged on the second lever portion 86 of the pivotal lever 81 lowers the undulations 26 of the lock spring 22, which are located below the push portion 53 and separates the undulations 26 from the engagement grooves 21 of the lower rail 5 to perform an unlocking action with the lock mechanism 20.

As shown in FIGS. 14 to 16, the lock release mechanism 40B according to the present embodiment includes a torsion spring 71B having the helical spring body 71x, which serves as the spring member 70 that generates an urging force in a direction in which the pivotal lever 81 returns to initial position Q0. Specifically, the torsion spring 71B applies an urging force to the pivotal lever 81 in a direction (clockwise in FIG. 14) opposite to the direction in which the pivotal lever 81 is pivoted by an operation force input through the wire cable 42 as described above in a state in which the spring body 71x is fitted onto the pivot shaft 81x of the pivotal lever 81. The lock release mechanism 40B according to the present embodiment includes a support bracket 54B that integrally holds the pivotal lever 81 and the torsion spring 71B.

Specifically, the support bracket 54B according to the present embodiment includes a base wall 55B secured to the upper wall 16B of the upper rail 6 from below and a support wall 56B that extends downward from the base wall 55B in the same manner as the support bracket 54 in the first embodiment. Further, the pivot shaft 81x of the pivotal lever 81 is formed by inserting a rivet-shaped shaft member 87 into the support wall 56B in the thickness direction (right-left direction in FIG. 16). With the lock release mechanism 40 according to the present embodiment, the spring body 71x of the torsion spring 71B fitted onto the pivot shaft 81x of the pivotal lever 81 is arranged in inner space α below the upper wall 16B of the upper rail 6.

Further, as shown in FIG. 16, the lock release mechanism 40B according to the present embodiment includes the support wall 56B, which includes the pivot shaft 81x, the pivotal lever 81, and the spring body 71x of the torsion spring 71B arranged in this order (from right side in FIG. 14) in the axial direction (right-left direction in FIG. 16) of the pivot shaft 81x of the pivotal lever 81.

In the lock release mechanism 40B according to the present embodiment, the shaft member 87 that forms the pivot shaft 81x of the pivotal lever 81 includes a rivet-shaped flange 88 that extends in the radial direction. The shaft member 87 is inserted into the support wall 56B of the support bracket 54B so that the flange 88 is arranged at the side of the support wall 56B (left side in FIG. 14) where the support surface 56s is located and the pivotal lever 81 and the torsion spring 71B are arranged. The flange 88 of the lock release mechanism 40B according to the present embodiment serves as a restriction wall 89 that restricts displacement of the spring body 71x in the axial direction of the pivot shaft 81x.

Specifically, the flange 88 is formed at a location that sandwiches the spring body 71x of the torsion spring 71B with the pivotal lever 81, which is pivotally supported by the pivot shaft 81x in the axial direction of the pivot shaft 81x. The flange 88 of the lock release mechanism 40B according to the present embodiment has a substantially disc-shaped form so that the helical spring body 71x is at least partially arranged at the inner side in the radial direction. Thus, the spring body 71x when acting to displace the torsion spring 71B in the axial direction of the pivot shaft 81x abuts against the restriction wall 89 of the flange 88.

In other words, the torsion spring 71B applies torsion about the pivot shaft 81x to urge the pivotal lever 81 as described above. Elastic force (elastic resiliency) deforms the torsion spring 71B in the axial direction of the pivot shaft 81x onto which the spring body 71x is fitted. Thus, in the lock release mechanism 40B according to the present embodiment, the restriction wall 89 formed by the flange 88 arranged on the pivot shaft 81x of the pivotal lever 81 restricts axial displacement of the spring body 71x that would be caused by such an elastic force. Elastic force (elastic resiliency) generated when the spring body 71x is elastically deformed is converted to an urging force that efficiently pivots the pivotal lever 81.

The torsion spring 71B according to the present embodiment includes a first engagement end 71v, which engages the pivotal lever 81, and a second engagement end 71w, which abuts the base wall 55 of the support bracket 54B from below. Specifically, the first engagement end 71v is bent in the direction parallel to the pivot shaft 81x of the pivotal lever 81 onto which the spring body 71x of the torsion spring 71B is fitted in the same manner as the bent portion 75 arranged on the torsion spring 71 in the above first embodiment. The first engagement end 71v engages the pivotal lever 81 in a state inserted into an engagement hole 90 in the pivotal lever 81. The second engagement end 71w of the torsion spring 71B according to the present embodiment engages the base wall 55 of the support bracket 54B while compressed downward in this state. Thus, the lock release mechanism 40B according to the present embodiment allows the torsion spring 71B to be coupled to the support bracket 54B in the same direction as the direction in which the pivotal lever 81 is coupled.

The present embodiment has the same advantages as the first embodiment.

The above illustrated embodiments may be modified as follows. The above-described embodiments and the following modifications can be combined as long as the combined modifications remain technically consistent with each other.

In the above embodiments, the lock spring 22 serves as an unlock element, and the push portion 53 of the lock release mechanism 40 (40B) lowers the lock spring 22 to perform an unlocking action with the lock mechanism 20. Instead, the unlock lever 30 of the lock mechanism 20, for example, may serve as an unlock element, and the push portion 53 of the lock release mechanism 40 may lower the unlock lever 30. That is, components of the lock mechanism 20 set as the unlock element may be changed in any manner as long as an unlocking action can be performed with the lock mechanism 20 when pushed by the push portion 53 of the lock release mechanism 40. In a lock mechanism including a lock member that engages the lower rail 5, the lock member may be an unlock element. That is, the configuration of the lock mechanism may be changed in any manner as long as an unlocking action is performed when the unlock element is pushed by the push portion 53 of the lock release mechanism 40. The direction in which the push portion 53 of the lock release mechanism 40 pushes the unlock element may be changed in any manner. For example, the unlock element can be pushed upward or sideward.

In the above embodiments, the lever member (52, 81), which is pivoted about the pivot shaft (52x, 81x), includes the push portion 53 of the unlock element. Instead, the push portion 53 may slide.

In the above embodiments, the lever member (51, 81) including the connecting portion (62, 84) to which the wire cable 42 is connected, projects upward out of the upper rail 6 (6B) through the hole 60 (60B) in the upper wall 16 (16B). Instead, the configuration described in the specification may be applied to a lever member, which projects sideward out of the upper rail 6 through a hole in the side wall 15. The configuration described in the specification may be applied when the connecting portion to which the wire cable 42 is connected is arranged in inner space α defined below the upper wall 16.

Specifically, in the embodiments, the pivot shaft (51x, 81x) of the lever member (51, 81) including the connecting portion (62, 84) to which the wire cable 42 is connected is arranged in inner space α below the upper wall 16. Instead, the entire portion of such a lever member may be arranged in inner space α.

In the first embodiment, the support bracket 54 integrally holds the input lever 51 to which the wire cable 42 is connected, the engagement lever 52 including the push portion 53, and the torsion spring 71. In the second embodiment, the support bracket 54B integrally holds the pivotal lever 81, which is connected to the wire cable 42 and includes the push portion 53, and the torsion spring 71B. Instead, part or all of the components of such a lock release mechanism 40 may be directly held or engaged with the upper rail 6.

In the above embodiments, the base wall 55 (55B) of the support bracket 54 (54B) is secured to the upper wall 16 (16B) of the upper rail 6 (6B) from below. Instead, the base wall 55 (55B) may be secured to the side wall 15 as long as it is arranged below the upper wall 16.

In the above embodiments, the torsion spring 71 (71B) is used as the spring member 70. Instead, types of spring used for the spring member 70, arrangement, and the like may be changed in any manner as long as the spring body having a unique elastically deformed shape to apply an urging force to the lever member is arranged in inner space α below the upper wall 16 of the upper rail 6.

Figure 17:
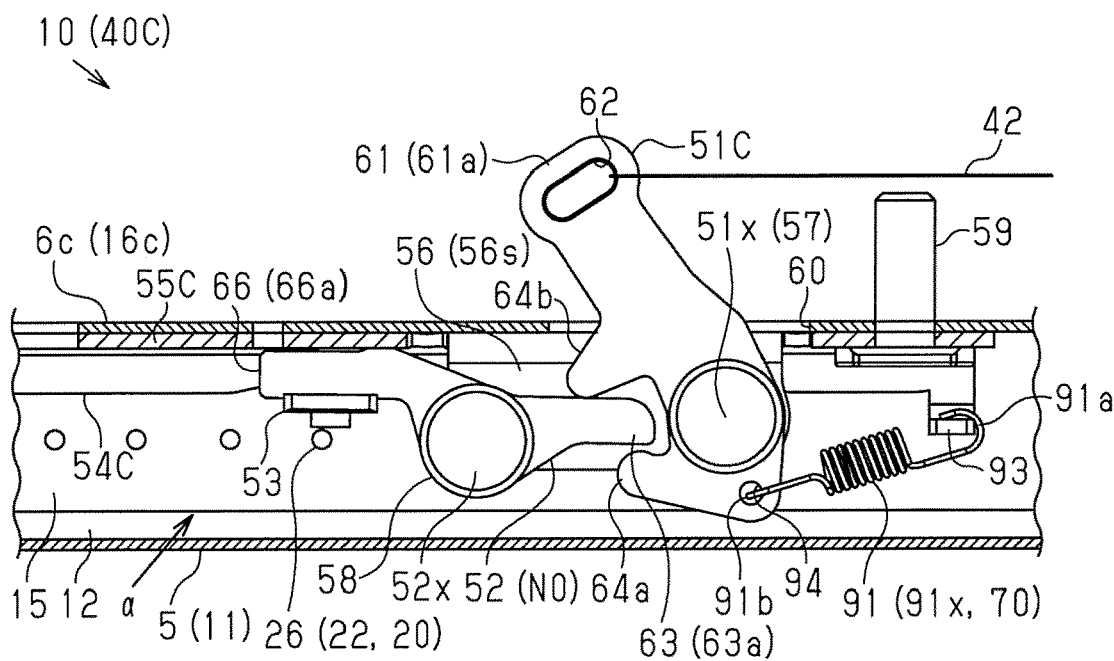
FIG. 17 is a cross-sectional view of a seat slide device showing the structure of a lock release mechanism in another example.

In a lock release mechanism 40C shown in FIG. 17, a tension coil spring 91 may be used as the spring member 70. Specifically, in the lock release mechanism 40C, a first end 91a and a second end 91b of the tension coil spring 91 that forms the spring member 70 are held by holding portions 93, 94 arranged in a support bracket 54C and an input lever 51C. The holding portion 93 of the support bracket 54C is arranged toward the rear of the vehicle from the input lever 51C and extended downward from the base wall 55C. The holding portion 94 of the input lever 51C is arranged at the lower end of the input lever 51C. With the lock release mechanism 40C, the input lever 51C is urged and pivoted by the elastic force of the tension coil spring 91, and the coiled spring body 91x of the tension coil spring 91 having a unique elastically deformed shape is arranged in inner space α defined below the upper wall 16C of the upper rail 6C.

In the first embodiment, the entire portion of the torsion spring 71 including the second end 71b, which serves as an engagement end that engages the input lever 51 that forms the lever member, may be arranged in inner space α defined below the upper wall 16 of the upper rail 6.

Further, the spring body (71, 91) of the spring member 70 may partially project downward out of the lower end of the upper rail 6 formed by the side walls as long as it does not interfere with relative movement of the upper rail 6 and the lower rail 5. That is, inner space α defined below the upper wall 16 by the side walls 15 and the upper wall 16 of the upper rail 6 is extended to include the inner space of the lower rail 5 when the upper rail 6 is arranged on the lower rail 5. Thus, the same advantages as the above embodiments are provided even when the spring body (71, 91) partially projects downward from the lower end of the upper rail 6.

In the first embodiment, the second engagement portion 74 of the input lever 51 includes the first hole 74a extending in the extending direction of the bent portion 75 arranged at the second end 71b of the torsion spring 71. The second engagement portion 74 also includes the second hole 74b continuous with the first hole 74a and extending in the circumferential direction of the pivot shaft 51x. Instead, the first engagement portion 73 of the support bracket 54 may include the first hole and the second hole. The first engagement portion 73 and the second engagement portion 74 may each include the first hole and the second hole.

In the second embodiment, the flange 88, which is arranged on the pivot shaft 81x of the pivotal lever 81 onto which the spring body 71x of the torsion spring 71B is fitted, serves as the restriction wall 89. The flange 88 restricts axial displacement of the spring body 71x located between the flange 88 and the pivotal lever 81. Instead, the shape, the manner of support, and the like of the restriction wall 89 may be changed in any manner. For example, the restriction wall 89 may be separate and supported by the side wall 15 of the upper rail 6B. Alternatively, the restriction wall 89 may extend from the support bracket 54B. Such a restriction wall may be used for the lock release mechanism 40 of the first embodiment.

In the second embodiment, the second engagement end 71w of the torsion spring 71B abuts (engages) the upper wall 16B of the upper rail 6B from below through the base wall 55B of the support bracket 54B. Instead, the second engagement end 71w of the torsion spring 71B may directly engage the upper wall 16B of the upper rail 6B. The engaging configuration of the torsion spring 71B (71) in the second embodiment may be applied to the configuration of the first embodiment that includes the second lever member (engagement lever 52), which engages the lever member (input lever 51) and is pivoted in cooperation with the lever member.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A vehicle seat slide device comprising:
   an upper rail that supports a seat located above the upper rail;
   a lower rail that supports the upper rail so that the upper rail is movable relative to the lower rail;
   a lock mechanism that restricts movement of the upper rail relative to the lower rail; and
   a lock release mechanism that permits movement of the upper rail relative to the lower rail by performing an unlocking action with the lock mechanism based on an operation force received from a transmitting member, wherein
   the upper rail includes two side walls, which are opposed to each other in a widthwise direction of the upper rail, and an upper wall, which connects the two side walls,
   the lock release mechanism includes
      a lever member including a connecting portion to which the transmitting member is connected, a push portion that pushes an unlock element of the lock mechanism and performs an unlocking action with the lock mechanism when the lever member is pivoted based on the operation force, and a spring member that applies an urging force to the lever member in a direction opposite to a direction in which the lever member is pivoted based on the operation force, the spring member includes an engagement end, which engages the lever member, and a spring body, and at least the spring body is arranged in an inner space of the upper rail defined below the upper wall.

2. The vehicle seat slide device according to claim 1, wherein the spring member is a torsion spring that applies the urging force to the lever member in a state in which the spring body is fitted onto a pivot shaft of the lever member arranged in the inner space.

3. The vehicle seat slide device according to claim 2, wherein the torsion spring includes a first engagement end, which engages the lever member, and a second engagement end, which engages the upper wall, and the second engagement end abuts the upper wall from below.

4. The vehicle seat slide device according to claim 2, wherein the lever member includes a restriction wall that restricts displacement of the spring body in an axial direction of the pivot shaft with the spring body located between the restriction wall and the lever member.

5. The vehicle seat slide device according to claim 4, wherein the restriction wall is a flange arranged on the pivot shaft.

6. The vehicle seat slide device according to claim 1, further comprising a support bracket that integrally holds the lever member and the spring member, wherein the support bracket is attached to the upper rail.

7. The vehicle seat slide device according to claim 6, wherein the spring member is a torsion spring that applies the urging force to the lever member in a state in which the spring body is fitted onto a pivot shaft of the lever member arranged in the inner space, the torsion spring includes a first end, which is engaged with a first engagement portion of the support bracket, and a second end, which serves as the engagement end and is engaged with a second engagement portion of the lever member, and the first end and the second end include bent portions, which are bent in a direction parallel to the pivot shaft onto which the spring body is fitted, and distal ends, which extend in a same direction.

8. The vehicle seat slide device according to claim 7, wherein at least one of the first engagement portion or the second engagement portion includes a first hole extending in an extending direction of a corresponding one of the bent portions in a state engaged with the corresponding one of the bent portions, and a second hole continuous with the first hole and extending in a circumferential direction of the pivot shaft.

9. The vehicle seat slide device according to claim 1, wherein the lock release mechanism includes a second lever member that engages the lever member and is pivoted in cooperation with the lever member, and the push portion is arranged on the second lever member.

10. The vehicle seat slide device according to claim 9, wherein the lock release mechanism includes a support bracket that integrally holds the lever member, the second lever member, and the spring member.

* * * * *